(12) United States Patent
Arnason

(10) Patent No.: US 11,602,133 B2
(45) Date of Patent: Mar. 14, 2023

(54) PUMPING DEVICES FOR TREATING AND TRANSFERRING ITEMS

(71) Applicant: Skaginn HF., Akranes (IS)

(72) Inventor: Ingolfur Arnason, Akranes (IS)

(73) Assignee: LAMBHUSASUND EHF., Akranes (IS)

( * ) Notice: Subject to any disclaimer, the term of this patent is extended or adjusted under 35 U.S.C. 154(b) by 0 days.

(21) Appl. No.: 17/259,153

(22) PCT Filed: Jul. 10, 2019

(86) PCT No.: PCT/IS2019/050007
§ 371 (c)(1),
(2) Date: Jan. 8, 2021

(87) PCT Pub. No.: WO2020/012510
PCT Pub. Date: Jan. 16, 2020

(65) Prior Publication Data
US 2021/0153482 A1 May 27, 2021

(30) Foreign Application Priority Data

Jul. 10, 2018 (IS) .......................................... 050230
May 6, 2019 (IS) .......................................... 050268

(51) Int. Cl.
*A01K 61/13* (2017.01)
*A01K 61/95* (2017.01)
(Continued)

(52) U.S. Cl.
CPC .............. *A01K 61/13* (2017.01); *A01K 61/65* (2017.01); *A01K 61/95* (2017.01); *A22B 5/04* (2013.01); *A22C 25/08* (2013.01); *A22C 25/14* (2013.01)

(58) Field of Classification Search
CPC ........ A01K 61/13; A01K 61/65; A01K 61/95; A22C 25/08; A22C 25/14
(Continued)

(56) References Cited

U.S. PATENT DOCUMENTS 3,489,074 A  1/1970 Farkas
3,804,959 A  4/1974 Stevenson
(Continued)

FOREIGN PATENT DOCUMENTS

EP    0237262 A2     9/1987
GB    2216770    *  10/1989
WO    2005085521 A1  9/2005

OTHER PUBLICATIONS

International Search Report and Written Opinion dated Jan. 14, 2020 for corresponding International Application No. PCT/IS2019/050007.

(Continued)

*Primary Examiner* — David J Parsley
(74) *Attorney, Agent, or Firm* — Tarolli, Sundheim, Covell & Tummino LLP

(57) ABSTRACT

The present invention relates to a method, a system and an apparatus for treating food items. Such method and device may, for instance, be used to cool down food items, bleed freshly slaughtered fish and treat live fish against parasites. The device and method of the present invention further uses temperature differences and agitation to tread food items. A method for reducing or eliminating sea lice from salmon fish, said method comprising: a) transporting the salmon fish from a reservoir and the feeding salmon fish in liquid into the tubing of a first pumping device, said liquid being at a temperature from +15 to +28° C., b) transporting the salmon fish in liquid through the tubing of the pumping device at a first set time period for treatment in said liquid, c) feeding the salmon fish out of the first pumping device, d) separating (Continued)

the liquid from the salmon fish, and e) transporting the salmon fish back to the reservoir, wherein the liquid media from the pumping device is redirected after separation from the salmon fish in step d) through a heat exchange element back into the pumping device for continued treatment of further salmon fish, and wherein the temperature difference between the liquid used in steps b) and the reservoir is more than 15° C.

13 Claims, 1 Drawing Sheet

(51) Int. Cl.
*A01K 61/65* (2017.01)
*A22C 25/14* (2006.01)
*A22B 5/04* (2006.01)
*A22C 25/08* (2006.01)

(58) Field of Classification Search
USPC .......................... 119/215, 650–651; 452/173
See application file for complete search history.

(56) References Cited

U.S. PATENT DOCUMENTS

| | | | |
|---|---|---|---|
| 9,301,498 B2* | 4/2016 | Ulriksen | A01K 61/00 |
| 10,051,843 B2* | 8/2018 | Lindgren | A01K 79/00 |
| 10,757,922 B2* | 9/2020 | Wiesman | A01K 61/13 |
| 10,843,207 B2* | 11/2020 | Haise | A01K 61/00 |
| 2014/0174371 A1 | 6/2014 | Ulriksen | |
| 2017/0172114 A1 | 6/2017 | Halse | |

OTHER PUBLICATIONS

Iceland Search Report dated Nov. 6, 2018 for corresponding Iceland Patent Application No. 050230.

\* cited by examiner

PUMPING DEVICES FOR TREATING AND TRANSFERRING ITEMS

RELATED APPLICATIONS

The present application is a U.S. National Stage application under 35 USC 371 of PCT Application Serial No. PCT/IS2019/050007, filed on 10 Jul. 2019; which claims priority from IS Patent Application No. 050230, filed 10 Jul. 2018; and IS Patent Application No. 050268, filed 6 May 2019, the entirety of each of which are incorporated herein by reference.

FIELD OF THE INVENTION

The invention relates to a method and a device for treating and transferring live and slaughtered fish and food items. Furthermore, the method and the device of the present invention use pumping devices to increase effectivity of the treatment of live fish and food items.

BACKGROUND

A continuous development of food processing, such as processing of fish products is always on demand with the focus on for instance to increase utilization and value of products as well as meeting demands for quality after processing. Cooling, rinsing, bleeding of freshly slaughtered animals such as fish, poultry requires mechanic devices to facilitate fast, efficient but relatively gentle handling and transportation through these processes.

One of the parts of the processing fish is the bleeding step. In a processing line where speed is of essence, one of the problems is that after the fish is bleed and gutted the fish will bleed into the meat. This will have an effect on the colour of the meat and thereby the price which can be obtained for the final product. Another problem is waste management of biological material such as blood, which is costly and leaves environmental footprints.

The salmon farming industry has been growing steadily since since the 1980s and is today a thriving industry in countries such as Chile, Norway and Iceland. One of the problems the salmon farming industry is facing is the management of sea lice, but many solutions have been tested both medicinal as well as non-medicinal. With respect of the environment and demand for more naturally farmed fish, non-medicinal ways of reducing sea lice are desirable.

One way of dealing with sea lice is the use of skirts such as tarpaulin sheets implemented across the upper portion of marine pens to prevent hatching sea lice larvae from migrating down to the lower portion of the pen and attach to the salmon. This solution requires monitoring and manipulation of oxygen levels in the upper part of the pen to make this approach more effective. Snorkel tubes have also been used to increase the oxygen level lower in the pen and therefore reducing the need of the salmon to swim to the upper portion of the pen for uptake of air into its swim bladders. Active measures such as water jets and lasers have been used to physically detach lice of the salmon, where the laser actually kills the lice but the water jet system is implemented in a defined area and only detaches the lice from the skin of the salmon and the lice are separated from the salmon in the defined area. Semi-physical measures such as traps have also been used, but they work in similar manner as traps for flies.

Spiral pumps have been used to transport items delicately through a closed environment in a low pressure system. Such pumps are ideal for pumping water-mixed material such as raw and cooked shrimp, shellfish and pelagic and other small fish according to the principle of Archimedes. By rotating slowly, the pump facilitates transport and/or elevation of water and material through pipes, without using any propeller. The food items are gently conveyed in a closed environment. The system also prevents the items from being exposed to the outside environment.

U.S. Pat. No. 5,275,091 discloses an apparatus for continuous and gentle processing a food products comprising food chunks of delicate fruit, vegetables or the like immersed in liquid, where the food products and the liquid is fed into a helical pump for heating/sterilization and then subsequently into a second helical pump for cooling. WO 05/085521 however provides a device to overcome the shortcomings of U.S. Pat. No. 5,275,091, namely to increase the reaction of the fluid to the food products, by providing a spiral pump with non-circular windings to prevent food stuff such as shrimp to form clumps or clog the pump.

SUMMARY OF THE INVENTION

The present invention provides a method, a system and a device for transferring and treating life fish or food items in liquid media. The apparatus and method are designed to facilitate treating the food items or living fish with temperature differences as well as transporting, rinsing, bleeding and cooling food items. The device of the present invention is designed as a pumping device and in some instances a spiral pump with a tubing that is helically wound around a frame structure rotating around a horizontal axis. The method and device of the present invention uses a set of pumping or transfer/treatment devices with one or more pumping devices to reduce or eliminate parasites such as sea lice off farmed salmon or to reduce or eliminate bacteria from slaughtered and gutted salmon fish. The device of the present invention may also be used to rinse food items or even to facilitate bleeding of newly slaughtered animals, such as fish or chicken. The pumping and treatment devices of the invention use piping and heat exchange elements to redirect the liquid used in the treatment from the out-feed end of the device back to the in-feed end at the desired treatment temperature. The device and method of the present invention can further be used to treat living animals such as fish against parasites. The new method is performed by subjecting food items or living animals to a defined temperature as it is being transported through the pumping device in temperature controlled liquid for a pre-determined time period and then transferring the items subsequently through a second pumping or transfer/treatment device in liquid at different temperature for another pre-determined time period. By subjecting food items, freshly slaughtered animals or living animals to rapid temperature difference ($\Delta T$) in liquid, while it is being transported and thereby increasing the flow of the temperature controlled liquid around the food items or animals, the function of the liquid media as treatment component is increased. The device of the present invention can be used for reducing or eliminating parasites such as sea lice off farmed salmon by pumping salmon from one pen to another or to separated space within a pen through at least one pumping device with higher temperature than in the pen and thereby subjecting the salmon briefly to a temperature difference. Due to the size difference of the salmon fish and the sea lice, as well as the fat content of salmon fish, the salmon fish can tolerate the temperature difference for a short period of time, but the sea lice cannot. In such a setup, the second pen would be the treatment device as the combination of warm temperature and movement of fish in the spiral pump and the temperature difference provided by the second pen provides the second treatment step in killing the lice. It is the combination of a) use of the spiral pump allowing treatment of live fish and slaughtered and gutted fish in temperature controlled liquid, b) subjecting the live fish or slaughtered and gutted fish to temperature difference using the transportation liquid in the pump, c) the effect of the flow of the transportation liquid in the pump against the live fish or slaughtered and gutted fish, and d) the rubbing of the live fish or slaughtered and gutted fish against one another and the inner surface of the piping which provides the improved device and method of the present invention resulting in increased effect of the transportation (treatment) liquid providing a solution and where the ΔT provides increased treatment effect but does not harm the live fish or reduces the quality of the slaughtered fish or food items being treated. Although the methods of the application are directed towards live fish or slaughtered and gutted fish, they may be applicable to other food items or objects.

One of the challenges in modern food industry is to reduce the amount of water used in producing food as well as using as much of the animals slaughtered for production of food. This includes exploring use of parts of the animals not used before and managing waste material in an environmental manner. Blood from fish during slaughtering has traditionally been rinsed off the fish using water or sea water, which then has to be disposed of with costly methods. The device and method of the present invention is also suitable for bleeding freshly slaughtered fish and collecting and concentrating the blood from the bleeding process. The bleeding process can be performed in liquid, where the blood containing liquid can be re-introduced into the pumping device through a heat exchange element to maintain a desired temperature for bleeding more fish and thereby reducing the use of water. As most of the blood is collected at the device where the fish is slaughtered, usually by stunning, the amount of blood in the bleeding liquid is not too much to reuse for further bleeding of fish. Thereafter the fish is transported to a second pumping or transfer/treatment device for further rinsing and cooling. By concentrating the blood from the bleeding process in this manner the cost of disposing of the blood is vastly reduced and it even provides the opportunity of using the blood to isolate blood components therefrom.

It is an object of the present invention to overcome and/or ameliorate the aforementioned drawbacks of the prior art and to provide an improved and/or alternative and/or additional method or device for facilitating treating, bleeding, cooling and/or transporting food items or living animals by using a combination of one or more pumping devices and optionally other transfer/treatment devices where the food items or animals are transported is liquid media. It is one preferred object of the present invention to provide a method and device to facilitate treatment the of food items or fish by subjecting them to a temperature difference as they are being transported through the pumping and transfer/treatment devices of the present invention in liquid media. Moreover, it is a preferred object of the present invention to provide a method and device, preferably designed to bleed fish, to cool down food items while being transported or conveyed from one location to another and to treat fish against parasites such as sea lice by subjecting the food items or fish to temperature difference in the liquid media for a shorter period of time as they are transported through the devices of the invention in temperature controlled liquid media. Another preferred object of the present invention is to provide a device having a design of a spiral pump where a batch of food items in temperature controlled liquid or fluid ice are introduced into a first winding and rotating the pump in intervals about 360° for the first batch to be transported into the second winding and then adding another batch of food items in liquid to the first winding. After treatment in the first pumping device the food items are transported into a second pumping or transfer/treatment device for treatment at a different temperature. An important aspect of the present invention is the use of ΔT between steps for obtaining the best effect of treatment during each step and then to constantly moving the food items or living animals during the treatment to increase the effect of each treatment step.

The object(s) underlying the present invention is (are) particularly solved by the features defined in the independent claims. The dependent claims relate to preferred embodiments of the present invention. Further additional and/or alternative aspects are discussed below.

Thus, at least one of the preferred objects of the present invention is solved by a method for reducing or eliminating sea lice from salmon fish. The method comprises the steps of:
a) transporting the salmon fish from a reservoir and the feeding salmon fish in liquid into the tubing of a first pumping device, said liquid being at a temperature from +15 to +28° C.,
b) transporting the salmon fish in liquid through the tubing of the pumping device at a first set time period for treatment in said liquid,
c) feeding the salmon fish out of the first pumping device,
d) separating the liquid from the salmon fish, and
e) transporting the salmon fish back to the reservoir,
wherein the liquid media from the pumping device is redirected after separation from the salmon fish in step d) through a heat exchange element back into the pumping device for continued treatment of further salmon fish, and wherein the temperature difference between the liquid used in steps b) and the reservoir is more than 15° C.

Such a method may further comprise the steps of i) transferring the salmon fish in liquid into a the tubing of a second pumping device, said liquid being at a temperature from +1 to +12° C., ii) transporting the salmon fish in liquid through the tubing of the second pumping device for a second set time period for treatment in said liquid, iii) feeding the salmon fish out of the second pumping device, and iv) separating the liquid from the salmon fish, between steps d) and e) of the method.

Another preferred object of the present invention is solved by a method for treating slaughtered and gutted salmon fish in liquid. The method comprises the steps of:
a) feeding the slaughtered and gutted salmon fish in liquid into the tubing of a pumping device, said liquid being at a first set temperature,
b) transporting the slaughtered and gutted salmon fish through the tubing of the pumping device for a first set time period for treatment in said liquid,
c) separating the liquid from the slaughtered and gutted salmon fish,
d) transferring said slaughtered and gutted salmon fish into liquid in a transfer/treatment device, said liquid being at a second set temperature,
e) transporting and/or treating said slaughtered and gutted salmon fish in the transfer/treatment device in liquid for a second set time period, and
f) feeding the slaughtered and gutted salmon fish out of the transfer or treatment device, g) separating the liquid from the slaughtered and gutted salmon fish, wherein the liquid media from the pumping device or the transfer/treatment device is redirected after separation from the slaughtered and gutted salmon fish in steps c) and g) through a heat exchange element back into the pumping device or second transfer/treatment device for continued treatment of slaughtered and gutted salmon fish, and wherein the temperature difference between the liquids used in steps b) and e) is more than 20° C.

One of the preferred objects of the present invention is solved by a method for treating live fish, slaughtered animals or food items in liquid. The method comprises the steps of:
a) feeding a live fish, slaughtered animals or food items in liquid into the tubing of a pumping device, said liquid being at a first set temperature,
b) transporting said live fish, slaughtered animals or food items in liquid through the tubing of the pumping device for a first set time period for treatment in said liquid,
c) separating the liquid from the live fish, slaughtered animals or food items,
d) transferring said live fish, slaughtered animals or food items in liquid into a transfer or treatment device, said liquid being at a second set temperature,
e) transporting and/or treating said live fish, slaughtered animals or food items in liquid in the transfer/treatment device for a second set time period, and
f) feeding the live fish, slaughtered animals or food items out of the transfer or treatment device,
g) separating the liquid from the live fish, slaughtered animals or food items, The liquid media from the pumping device or the transfer/treatment device is redirected after separation from the live fish, slaughtered animals or food items in steps c) and g) through a heat exchange element back into the pumping device or second transfer/treatment device for continued treatment of further live fish, slaughtered animals or food items.

Another preferred object of the present invention is solved by an apparatus for treating live fish, slaughtered animals or food items in liquid The device comprises i) at least one pumping device, where the pumping device comprises a tubing for transporting and treating live fish, slaughtered animals or food items in liquid in liquid simultaneously, ii) a heat exchanging device connected to the at least one pumping device for setting the temperature of the liquid in which the treating live fish, slaughtered animals or food items in liquid are transported and treated in, iii) at least one transfer/treatment device for transporting or treating live fish, slaughtered animals or food items in liquid in liquid, said liquid being at a second set temperature, iv) a heat exchanging device connected to the at least one transfer/treatment device for setting the temperature of the liquid in which the treating live fish, slaughtered animals or food items in liquid are transported and treated in. The device is characterised in that a separation device is positioned at the outfeed end of the at least one pumping device and the at least one transfer/treatment device for separating the liquid from the live fish, slaughtered animals or food items and in that connections are provided for redirecting the liquid media from the separation device through separate heat exchange elements respectively back into the at least one pumping device or the at least one transfer/treatment device for continued treatment of further salmon.

One of the preferred objects of the present invention is solved by a system for treating food items in liquid media. The system comprises i) providing at least one pumping device, said pumping device comprising tubing for transporting and treating live fish, slaughtered animals or food items in liquid in liquid at a first set temperature for a first set time period, ii) a heat exchanging device connected to the at least one pumping device for setting the temperature of the liquid in which the treating live fish, slaughtered animals or food items in liquid are transported and treated in, iii) at least one transfer/treatment device for transporting and treating live fish, slaughtered animals or food items in liquid in liquid at a second set temperature for a second set time period, and iv) a heat exchanging device connected to the at least one transfer/treatment device for setting the temperature of the liquid in which the treating live fish, slaughtered animals or food items in liquid are transported and treated in. The system is characterised in that a separation device is positioned at the outfeed end of the at least one pumping device and the at least one transfer/treatment device for separating the liquid from the live fish, slaughtered animals or food items and in that connections are provided for redirecting the liquid media from the separation device through separate heat exchange elements respectively back into the at least one pumping device or the at least one transfer/treatment device for continued treatment of further salmon.

Another object of the present invention is solved by a method for reducing or eliminating sea lice from salmon fish. The method comprises the steps of:
a) feeding the salmon fish in liquid into the tubing of a first pumping device, said liquid being at a temperature from +15 to +50° C.,
b) transporting the salmon fish in liquid through the tubing of the pumping device at a first set time period for treatment in said liquid,
c) separating the liquid from the salmon fish,
d) transferring the salmon fish into a the tubing of a second pumping device, said liquid being at a temperature from −5 to −12° C.,
e) transporting the salmon fish in liquid through the tubing of the second pumping device for a second set time period for treatment in said liquid, and
f) feeding the salmon fish out of the second pumping device,
g) separating the liquid from the salmon fish, and
h) separating the sea lice from the liquid from the second pumping device, The method is characterised in that the liquid media from each pumping device is redirected after separation from the salmon fish in steps c) and g) through a heat exchange element back into the pumping device for continued treatment of further salmon fish.

Another object of the present invention is solved by system or apparatus for treating live fish, slaughtered animals or food items in liquid comprising: i) providing at least one pumping device, said pumping device comprising tubing for transporting and treating live fish, slaughtered animals or food items in liquid in liquid at a first set temperature for a first set time period, ii) a heat exchanging device connected to the at least one pumping device for setting the temperature of the liquid in which the treating live fish, slaughtered animals or food items in liquid are transported and treated in, iii) at least one transfer/treatment device for transporting and treating live fish, slaughtered animals or food items in liquid in liquid at a second set temperature for a second set time period, and iv) a heat exchanging device connected to the at least one transfer/treatment device for setting the temperature of the liquid in which the treating live fish, slaughtered animals or food items in liquid are transported and treated in. The system and the apparatus are characterised in that a separation device is positioned at the outfeed end of the at least one pumping device and the at least one transfer/treatment device for separating the liquid from the live fish, slaughtered animals or food items and in that connections are provided for redirecting the liquid media from the separation device through separate heat exchange elements respectively back into the at least one pumping device or the at least one transfer/treatment device for continued treatment of further live fish, slaughtered animals or food items.

The present invention further provides an apparatus and method to facilitate bleeding and rinsing of whole slaughtered fish before processing or cooling, where collection of at least portion of the blood is possible during rinsing the fish with water or other liquid. One of the challenges in modern food industry is to reduce the amount of water used in producing food as well as using as much of the animals slaughtered for production of food. This includes exploring use of parts of the animals not used before and managing waste material in an environmental manner. Blood from fish during slaughtering has traditionally been rinsed off the fish using water or sea water, which then has to be disposed of with costly methods. The present invention provides a device and method to reduce waste and waste management of biologic material as well as rinsing blood of freshly caught and slaughtered fish to increase the economic value of the fish.

Therefore another preferred object of the present invention is solved by a method to facilitate bleeding of fish. The method comprises the steps of:
a) feeding a slaughtered fish in liquid into the tubing of a pumping device, said liquid being at a first set temperature,
b) transporting said slaughtered fish in liquid through the tubing of the pumping device for a first set time period for treatment in said liquid,
c) separating the liquid from the slaughtered fish,
d) transferring said slaughtered fish into a transfer/treatment device for continuing bleeding and facilitate rinsing of said slaughtered fish in liquid, said liquid being at a second set temperature,
e) transporting or treating said slaughtered fish in liquid in the transfer/treatment device for a second set time period, and
f) feeding the slaughtered fish out of the transfer or treatment device,
g) separating the liquid from the slaughtered fish, The method is characterised in that the liquid media from the pumping device or the transfer/treatment device is redirected after separation from the slaughtered fish in steps c) and g) through a heat exchange element back into the pumping device or second transfer/treatment device for continued treatment of further live fish, slaughtered animals or food items.

Another object of the present invention is solved by system or apparatus for treating live fish, slaughtered animals or food items in liquid comprising: i) providing a first pumping device, said pumping device comprising tubing for transporting and treating live fish, slaughtered animals or food items in liquid, ii) a heat exchanging device connected to the at least one pumping device for setting the temperature of the liquid in which the treating live fish, slaughtered animals or food items in liquid are transported and treated in, iii) at least one second pumping device, said at least one second pumping device comprising tubing for transporting and treating live fish, slaughtered animals or food items in liquid, and iv) a second heat exchanging device connected to the at least one second pumping device for setting the temperature of the liquid in which the treating live fish, slaughtered animals or food items in liquid are transported and treated in. A separation device is positioned at the outfeed end of the at each pumping device for separating the liquid from the live fish, slaughtered animals or food items, where connections are provided for redirecting the liquid media from each separation device through separate heat exchange elements respectively back into each pumping device for continued treatment of further live fish, slaughtered animals or food items. Furthermore, control means for each pumping device generates a rocking motion in the tubing by rotating the tubing alternately backwards and forwards repeatedly for a predetermined period. Embodiments such as using different temperature for the first and the second pumping device and to provide a rocking motion during the treatment provides increased efficiency of the treatment as the liquid is passed by the slaughtered animals or live fish repeatedly during the rocking motion and the use of ΔT between steps enhances the treatment effect even further.

Another object of the present invention is solved by method for treating live fish, where the method comprises the steps of: a) feeding a live fish in liquid into the tubing of a pumping device, said liquid being at a first set temperature, b) transporting said live fish through the tubing of the pumping device for a first set time period for treatment in said liquid, c) separating the liquid from the live fish, d) transferring said live fish in liquid into a transfer or treatment device, said liquid being at a second set temperature, e) transporting and/or treating said live in liquid in the transfer/treatment device for a second set time period, f) feeding the live fish out of the transfer or treatment device, and g) separating the liquid from the live fish. The liquid media from the pumping device or the transfer/treatment device is redirected after separation from the live fish in step c) through a heat exchange element back into the pumping device for continued treatment of further live fish.

Another object of the present invention is solved by method for treating live fish, slaughtered animals or food items in liquid, where the method comprises: a feeding live fish, slaughtered animals or food items from a reservoir into the first winding of a spiral pump, b) feeding liquid into the first winding of the spiral, said liquid being at a temperature which is higher than the temperature of the reservoir, c) rotating the spiral pump to facilitate flow of the warmer liquid around the live fish, slaughtered animals or food items, d) feeding the live fish, slaughtered animals or food items out of the spiral pump, e) separating the pumping liquid from the live fish, slaughtered animals or food items, and f) feeding the live fish, slaughtered animals or food items into a transfer and/or treatment device, said transfer and/or treatment device containing liquid at a temperature which is lower than the temperature in the spiral pump, thereby providing a ΔT treatment for the live fish, slaughtered animals or food items. The liquid media from the pumping device or the transfer/treatment device is redirected after separation from the live fish in step e) through a heat exchange element back into the pumping device for continued treatment of further live fish, slaughtered animals or food items.

All embodiments listed herein relate to both the apparatus, system and the method of the present invention.

In an embodiment of the present invention the first and second pumping devices are spiral pumps.

In an embodiment of the present invention the liquid separated from the pumping devices is filtered before redirecting the liquid through the heat exchange element.

In an embodiment of the present invention the pumping devices are set up on a fishing vessel or on a structure adjacent to a pen structure for farming salmon fish.

In an embodiment of the present invention the temperature difference between the liquids used in steps b) and e) is 10 to 50° C., or 15 to 45° C., or 20 to 40° C., such as 25 to 30° C.

In an embodiment of the present invention the temperature of the liquid used in heating the salmon for killing sea lice is between 12 and 28° C., or 15 to 28° C., or 20 to 28° C., such as 24 to 28° C.

In an embodiment to this object, the method relates to treating live fish and the reservoir is a separated area in one or more sea pen, whereas the pumping devices are positioned on a mooring structure or on a vessel.

In an embodiment of the present invention the liquid separated from the pumping device or the transfer/treatment device is filtered before redirecting the liquid through the heat exchange element.

In an embodiment of the present invention the at least one pumping device is a spiral pump.

In an embodiment of the present invention the at least one transfer/treatment device is an elongated cylindrical or semi-cylindrical tank and comprises a spiral shaped blade mounted on a rotation axis to convey the objects in liquid along the length of the tank.

In an embodiment of the present invention the at least one transfer/treatment device is a treatment tub or a tank where live fish, slaughtered animals or food items are treated in liquid before they are transferred out the tank or tub for further treatment or packing.

In an embodiment of the present invention the transfer/treatment device is a second pumping device.

In an embodiment of the present invention a filtering device is positioned in the piping leading from the separation device to filter particles from the liquid before it passes through the heat exchange element.

In an embodiment of the present invention the apparatus being set up on a fishing vessel or on a structure adjacent to a pen structure for farming salmon.

In an embodiment of the present invention the liquid separated from the pumping device is mostly blood.

In an embodiment of the present invention the liquid separated from each pumping device is filtered before redirecting the liquid through the heat exchange element.

In an embodiment of the present invention the apparatus comprises a computing means for controlling the rotation of the pump and the interval (time) between each rotation. The computing means also calculates the amount of liquid, additives and food items fed into the first winding to maintain a desired volume and ration of food items vs. liquids. This varies between different food items.

In an embodiment of the present invention, when using a spiral pump, control means alters the speed of the rotation of the horizontally rotating frame structure at least once during every full cycle rotation.

In an embodiment of the present invention, when using a spiral pump, the control means of the pump generates a rocking motion in the tubing by rotating the horizontally rotating frame structure alternately backwards and forwards repeatedly for a predetermined period.

In an embodiment of the present invention, when using a spiral pump, mixing of slaughtered animals or food items and liquid is performed in an in-feeding chamber for collecting items prior to transferring the food items and liquid into the first winding of the pump.

In an embodiment of the present invention the liquid for treatment of live fish, slaughtered animals or food items comprises one or more of, but not limited to water, sea water, brine, a salt-controlled and temperature controlled solution from a cooling system, fluid ice or any combination thereof.

In an embodiment of the present invention, where a spiral pump is used, the helical wound tubing has three to fifty windings, such as three to twenty-five windings or three to ten windings. The thickness of the tubing is determined by the amount of live fish, slaughtered animals or food items to be treated and the speed of treatment in each winding of the pump.

In an embodiment of the present invention the apparatus further comprises a cooling system or a heat exchange device bringing the liquid for treating the live fish, slaughtered animals or food items to a predetermined temperature and for making the liquid a salt controlled and temperature controlled solution.

In an embodiment of the present invention where the method and the apparatus is used to facilitate bleeding of fish, the blood is collected as the items are retrieved from the outfeed end of the spiral pump to either further process the blood such as to collect components therefrom or for disposal of the blood directly in a more concentrated state.

In an embodiment of the present invention where the method and the apparatus is used to facilitate bleeding of fish, the first bleeding step is performed at a higher temperature for a shorter time than the second step in a pump or a tank with a spiral blade.

In the present context the term "treating food items" relates to rinsing, washing, bleeding, cooling or adding substances to food items such as, but not limited to, salts, phosphates or anti-bacterial agents etc.

In the present context the term "transfer/treatment device" relates to any device to treat and/or transfer a live fish, slaughtered animals or food items in liquid. Such device I selected from devices such as, but not limited to; a spiral pump, a screw conveyor, tubing for transferring items in liquid, tubs, marine pen, etc.

In the present context the term "pumping device" relates to a pumping device for pumping items in liquid such as a spiral pump (Archimedes pump) or any other pumping device with tubing for transferring items in liquid from one reservoir to another.

In the present context the terms "salmon" or "salmon fish" refers to species of the ray-fined fish in the Salmonidae family, comprising Salmon, trout, char, grayling and white-fish. In the present context the salmon fish is wild or farmed.

In the present context the terms "food items" or "food objects" are used equally for food items such as slaughtered fish or chicken, as well as for parts or animals such as aquatic animals, birds or other smaller slaughtered animals.

In the present context the term "under-cooling" or "sub-chilling" refers to the process or method of bringing fish to a desired temperature at or near the phase transition of freezing the fish without freezing the fish, and generally below the freezing point of water (0° C.). Furthermore, these terms refer to a fish or fish product being brought to or kept at a desired temperature at or near the phase transition of freezing the fish without freezing the fish, such as a temperature below 0° C. (sub-zero conditions), such as preferably at or below $-0.2°$ C., or more preferably at or below $-0.5°$ C., or at or below $-0.7°$ C., or at or below $-0.8°$ C., such as at or below $-1.0°$ C., such as at or below $-1.5°$ C.

In one aspect a method is provided using one or more pumps of the invention where slaughtered fish is sub-chilled and is at a temperature between $-0.1$ and $-2°$ C. Subsequently the fish is subjected to 60° C. for a short period of time in one or more windings of the pump, such that only the surfaces (skin and abdomen) is heated. This will result in the in increased (expanded) surface volume of membranes and skin as compared to the flesh/meat. Next the fish is subjected to cooling in one or more windings of the pump or a subsequent pump at a temperature below the temperature of the flesh. This results in shrinking of membranes and skin as they freeze.

DESCRIPTION OF VARIOUS EMBODIMENTS

The present invention will become more fully understood from the detailed description given hereinafter and the accompanying drawings which are given by way of illustration only, and thus, are not limitative of the present invention, and wherein.

Figure 1:
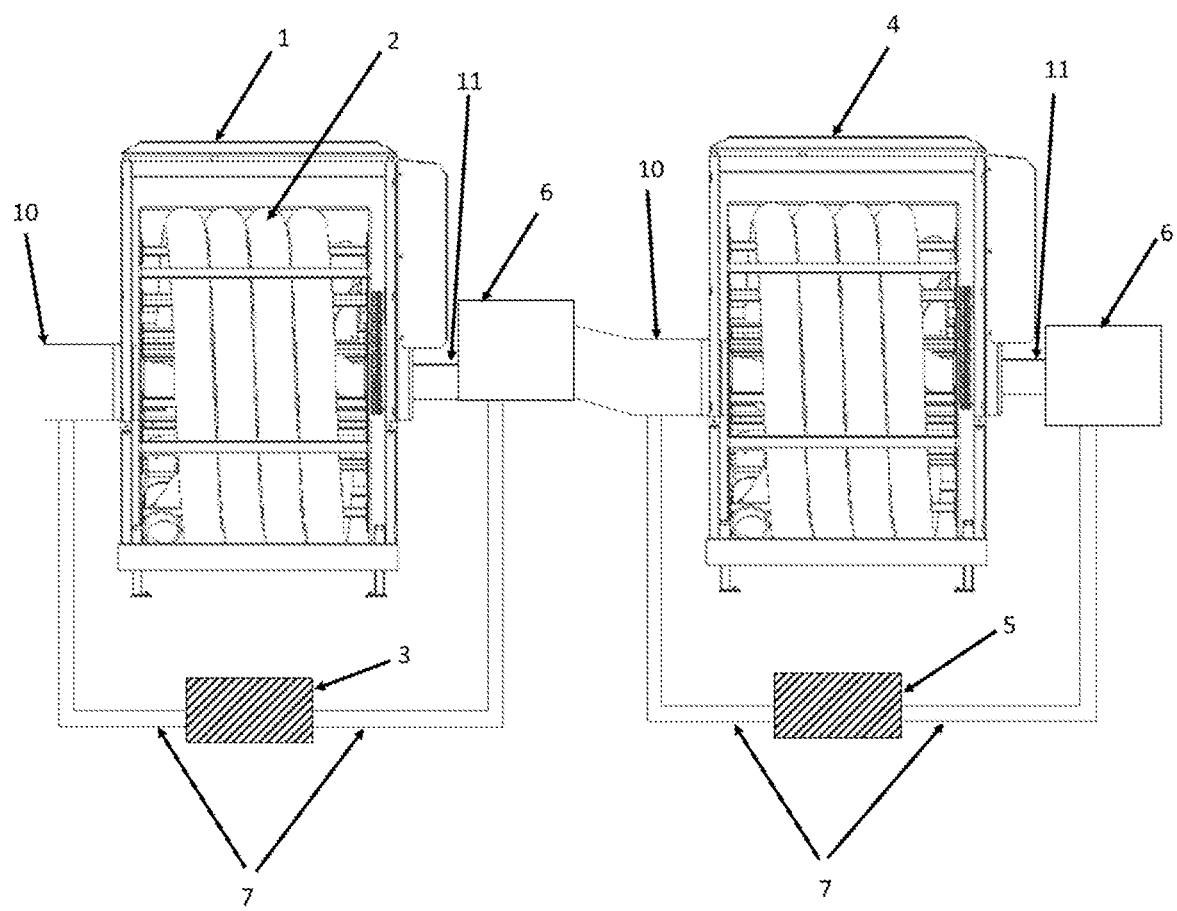
FIG. 1 is a front view of the apparatus of the present invention

FIG. 1 shows a schematic drawing of an apparatus of the present invention where the pumping device and the transfer/treatment device are both spiral pumps. The pumping device 1 has tubing 2 for transporting and treating live fish, slaughtered animals or food items in liquid in liquid. The second transfer/treatment device 4 is a spiral pump as well and both pumps are connected to a heat exchanging device 3 and 5 by connections piping 7. The pumping devices shown in FIG. 1 are spiral pumps with a helical wound tubing 2 with an in-feed end 10 and an out-feed end 11.

Figure 2:
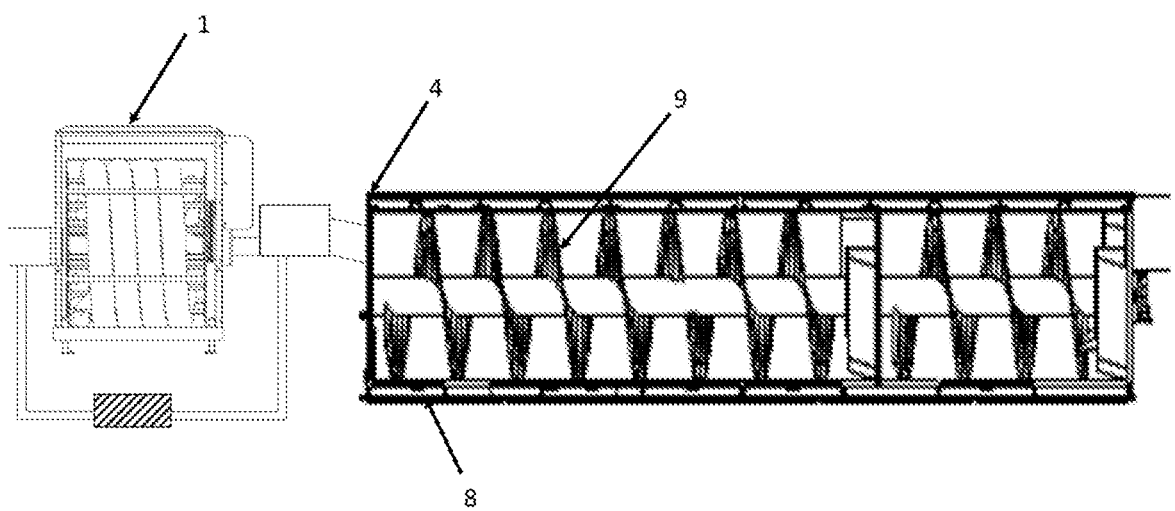
FIG. 2 is perspective drawing of an apparatus according to one embodiment of the present invention.

FIG. 2 shows a schematic drawing of an apparatus of the present invention where the pumping device is a spiral pump 1 and the transfer/treatment device 4 is a tank 8 with a spiral blade 9 to advance slaughtered animals or food items along the tank during treatment.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A method for reducing or eliminating sea lice from salmon fish, said method comprising:
   a) transporting the salmon fish from a reservoir and feeding the salmon fish in liquid into tubing of a first spiral pumping device, said liquid being at a temperature from +15 to +28° C., the tubing being helically wound around a frame structure rotating about a horizontal axis,
   b) transporting the salmon fish in liquid through the tubing of the first spiral pumping device at a first set time period for treatment in said liquid,
   c) feeding the salmon fish out of the first spiral pumping device,
   d) separating the liquid from the salmon fish, and
   e) transporting the salmon fish back to the reservoir, wherein the liquid from the first spiral pumping device is redirected after separation from the salmon fish in step d) through a heat exchange element back into the first spiral pumping device for continued treatment of further salmon fish, and wherein the temperature difference between the liquid used in step b) and the reservoir is more than 15° C., further comprising the steps of:
   i) transferring the salmon fish in liquid into a tubing of a second pumping device, said liquid being at a temperature from +1 to +12° C.,
   ii) transporting the salmon fish in liquid through the tubing of the second pumping device for a second set time period for treatment in said liquid,
   iii) feeding the salmon fish out of the second pumping device, and
   iv) separating the liquid from the salmon fish.

2. A method according to claim 1, wherein the second pumping device is a spiral pump.

3. A method according to claim 1, wherein the liquid separated from the first spiral pumping device is filtered before redirecting the liquid through the heat exchange element.

4. A method according to claim 1, wherein the first spiral pumping device is set up on a fishing vessel or on a structure adjacent to a pen structure for farming salmon fish.

5. A method according to claim 1, wherein live fish is being treated and the reservoir and the first spiral pump is in a separated area in one or more sea pen, where the first spiral pump is positioned on a mooring structure or on a vessel.

6. A method for treating slaughtered and gutted salmon fish in liquid, said method comprising:
   a) feeding the slaughtered and gutted salmon fish in liquid into a tubing of a pumping device, said liquid being at a first set temperature, b) transporting the slaughtered and gutted salmon fish through the tubing of the pumping device for a first set time period for treatment in said liquid,
c) separating the liquid from the slaughtered and gutted salmon fish,
d) transferring said slaughtered and gutted salmon fish into liquid in a transfer or treatment device, said liquid being at a second set temperature,
e) transporting and/or treating said slaughtered and gutted salmon fish in the transfer or treatment device in liquid for a second set time period,
f) feeding the slaughtered and gutted salmon fish out of the transfer or treatment device, and
g) separating the liquid from the slaughtered and gutted salmon fish, wherein the liquid media from the pumping device or the transfer or treatment device is redirected after separation from the slaughtered and gutted salmon fish in steps c) and g) through a heat exchange element back into the pumping device or a second transfer or treatment device for continued treatment of slaughtered and gutted salmon fish, and wherein the temperature difference between the liquids used in steps b) and e) is more than 20° C.

7. A method according to claim 6, wherein the transfer/treatment device is a treatment tub or a tank where slaughtered and gutted salmon fish are treated in liquid before they are transferred out the tank or tub for further treatment or packing.

8. A method according to claim 6, wherein the transfer/treatment device is an elongated cylindrical or semi-cylindrical tank and comprises a spiral shaped blade mounted on a rotation axis to convey the objects in liquid along the length of the tank.

9. A method for treating live fish, slaughtered animals or food items in liquid, said method comprising:
a) feeding live fish, slaughtered animals or food items in liquid into tubing of a first pumping device, said liquid being at a first set temperature,
b) transporting said live fish, slaughtered animals or food items in liquid through the tubing of the first pumping device at a first set time period for treatment in said liquid,
c) separating the liquid from the live fish, slaughtered animals or food items,
d) transferring said live fish, slaughtered animals or food items into a transfer or treatment device for transporting or treating live fish, slaughtered animals or food items in liquid in liquid, said liquid being at a second set temperature,
e) transporting or treating said live fish, slaughtered animals or food items in liquid in the transfer or treatment device for a second set time period,
f) feeding the live fish, slaughtered animals or food items out of the transfer or treatment device, and
g) separating the liquid from the live fish, slaughtered animals or food items, wherein the liquid media from the pumping device or the transfer or treatment device is redirected after separation from the live fish, slaughtered animals or food items in steps c) and g) through a heat exchange element back into the pumping device or a second transfer or treatment device for continued treatment of further live fish, slaughtered animals or food items, and wherein the temperature difference between the liquid used in steps b) and e) is more than 15° C.

10. An apparatus for performing the method of claim 9, wherein the first pumping device is a spiral shaped pump and the transfer or treatment device is either a spiral shaped pump or an elongated cylindrical or semi-cylindrical tank and comprises a spiral shaped blade mounted on a rotation axis to convey the objects in liquid along the length of the tank.

11. A method to facilitate bleeding of slaughtered fish in liquid, said method comprising:
a) feeding slaughtered fish in liquid into tubing of a pumping device, said liquid being at a first set temperature,
b) transporting said slaughtered fish in liquid through the tubing of the pumping device for a first set time period for treatment in said liquid,
c) separating the liquid from the slaughtered fish,
d) transferring said slaughtered fish into a transfer or treatment device for continuing bleeding and facilitate rinsing of said slaughtered fish in liquid, said liquid being at a second set temperature,
e) transporting or treating said slaughtered fish in liquid in the transfer or treatment device for a second set time period,
f) feeding the slaughtered fish out of the transfer or treatment device, and
g) separating the liquid from the slaughtered fish, wherein the liquid media from the pumping device or the transfer or treatment device is redirected after separation from the slaughtered fish in steps c) and g) through a heat exchange element back into the pumping device or transfer/treatment device for continued treatment of further live fish, slaughtered animals or food items, and wherein the temperature difference between the liquid used in steps b) and e) is more than 15° C.

12. A method according to claim 11, wherein the liquid separated from the pumping device is mostly blood.

13. A method according to claim 11, wherein the liquid separated from the pumping device and the transfer or treatment device is filtered before redirecting the liquid through the heat exchange element.

* * * * *